(12) United States Patent
Yao et al.

(10) Patent No.: US 11,461,146 B2
(45) Date of Patent: Oct. 4, 2022

(54) SCHEDULING SUB-THREAD ON A CORE RUNNING A TRUSTED EXECUTION ENVIRONMENT

(71) Applicant: Huawei Technologies Co., Ltd., Shenzhen (CN)

(72) Inventors: Dongdong Yao, Beijing (CN); Yu Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 13 days.

(21) Appl. No.: 17/126,873

(22) Filed: Dec. 18, 2020

(65) Prior Publication Data
US 2021/0103470 A1 Apr. 8, 2021

Related U.S. Application Data

(63) Continuation of application No. PCT/CN2019/086133, filed on May 9, 2019.

(30) Foreign Application Priority Data

Jun. 19, 2018 (CN) .......................... 201810632168.2

(51) Int. Cl.
*G06F 9/50* (2006.01)
*G06F 21/53* (2013.01)
*G06N 3/063* (2006.01)

(52) U.S. Cl.
CPC .............. *G06F 9/505* (2013.01); *G06F 21/53* (2013.01); *G06N 3/063* (2013.01); *G06F 2209/5018* (2013.01)

(58) Field of Classification Search
CPC .. G06F 9/505; G06F 21/53; G06F 2209/5018; G06N 3/063
See application file for complete search history.

(56) References Cited

U.S. PATENT DOCUMENTS 11,263,312 B1 * 3/2022 Meng ................... G06F 21/73
2004/0221269 A1  11/2004 Ray et al.
(Continued)

FOREIGN PATENT DOCUMENTS

| CN | 103064742 A | 4/2013 |
| CN | 106547618 A | 3/2017 |

(Continued)

OTHER PUBLICATIONS

Guilbon, J., "Introduction to Trusted Execution Environment: ARMs TrustZone," https://blog.quarkslab.com/introduction-to-trusted-execution-environment-arms-trustzone.html, XP055808991, Jun. 19, 2018, 6 pages.

*Primary Examiner* — Benjamin C Wu
(74) *Attorney, Agent, or Firm* — Conley Rose, P.C.

(57) ABSTRACT

A method, implemented by a computer system comprising a trusted execution environment (TEE) and a rich execution environment (REE) includes creating, by the TEE, a plurality of sub-threads preparing to implement sub-functions of a trusted application (TA), for each sub-thread, triggering, by the TEE, the REE to generate a shadow thread, where running of the shadow thread will cause a core on which the shadow thread runs to enter the TEE, and scheduling the created sub-thread to the entered core for execution.

20 Claims, 10 Drawing Sheets

(56) References Cited

U.S. PATENT DOCUMENTS

| | | | | |
|---|---|---|---|---|
| 2014/0095918 A1* | 4/2014 | Stahl | ................... | G06F 21/725 |
| | | | | 713/500 |
| 2014/0205099 A1* | 7/2014 | Christodorescu | ....... | H04L 9/321 |
| | | | | 380/278 |
| 2014/0317686 A1* | 10/2014 | Vetillard | ................. | G06F 21/74 |
| | | | | 726/2 |
| 2018/0034793 A1* | 2/2018 | Kibalo | ................... | G06F 21/575 |
| 2018/0101688 A1 | 4/2018 | Zage et al. | | |
| 2020/0050798 A1* | 2/2020 | Jiang | ..................... | H04L 9/3247 |
| 2020/0151428 A1* | 5/2020 | Guo | ..................... | G06V 40/173 |
| 2020/0250302 A1* | 8/2020 | Chen | ................... | G06F 21/121 |
| 2020/0260278 A1* | 8/2020 | Du | ........................ | H04L 9/3263 |
| 2021/0034763 A1* | 2/2021 | Li | ........................ | H04L 9/3231 |
| 2021/0064740 A1* | 3/2021 | Han | ..................... | G06F 9/5038 |
| 2021/0240807 A1* | 8/2021 | Wang | ................ | G06Q 20/3267 |
| 2021/0390173 A1* | 12/2021 | Wang | ..................... | G06F 21/12 |
| 2022/0006617 A1* | 1/2022 | Wu | ........................ | H04L 65/40 |
| 2022/0172192 A1* | 6/2022 | Lee | ................... | G06Q 20/3224 |

FOREIGN PATENT DOCUMENTS

| | | | |
|---|---|---|---|
| CN | 106548077 A | 3/2017 | |
| CN | 106844082 A | 6/2017 | |
| EP | 2759955 A1 | 7/2014 | |
| EP | 3173926 A1 | 5/2017 | |

* cited by examiner

SCHEDULING SUB-THREAD ON A CORE RUNNING A TRUSTED EXECUTION ENVIRONMENT

CROSS-REFERENCE TO RELATED APPLICATIONS

This application is a continuation of International Patent Application No. PCT/CN2019/086133 filed on May 9, 2019, which claims priority to Chinese Patent Application No. 201810632168.2 filed on Jun. 19, 2018. The disclosures of the aforementioned applications are hereby incorporated by reference in their entireties.

TECHNICAL FIELD

This application relates to operating system technologies, and in particular, to a method and an apparatus for implementing multiprocessing on a trusted execution environment (TEE) in a multidomain operating system, and a system.

BACKGROUND

As a representative security framework of a terminal device, advanced reduced instruction set computer (RISC) machines (ARM) TrustZone® emerges to ensure security of the terminal device. In the ARM TrustZone® architecture, system-level security is achieved by dividing software and hardware resources of a system on chip (SoC) into two worlds a normal world and a secure world. The two worlds may also be referred to as a secure domain and a non-secure domain, and correspond to a rich execution environment (REE) and a TEE respectively. The REE and the TEE run on a same physical device, and one operating system is run in each of the REE and the TEE. A client application (CA) having a low security requirement is run in the REE. A trusted application (TA) having a high security requirement is run in the TEE, and the TEE provides a secure execution environment for an authorized TA. Communication is performed between the CA and the TA according to a communication mechanism provided by ARM TrustZone®, where the communication is similar to communication performed between a client and a server.

Currently, a biometric recognition technology, for example, a fingerprint recognition technology or a facial recognition technology, is applied to more application scenarios on a terminal. Both the fingerprint recognition technology and the facial recognition technology can be used in scenarios such as unlocking the terminal and making payment on the terminal. The use of the biometric recognition technology brings great convenience to a user of the terminal. However, some biometric features of the user, which are sensitive personal data, are stored when the biometric recognition technology is used. Therefore, a solution using the biometric recognition technology has a high security requirement for the terminal.

In other approaches, the ARM TrustZone® architecture may be used to ensure security of the biometric recognition solution. Specifically, main service logic (including feature extraction, feature comparison, liveness detection, and feature storage) of biometric recognition is implemented as a TA, and the TA is run in the TEE. In addition, biometric feature data is also stored in the TEE. In this way, a secure environment provided by the TEE ensures security of the entire solution.

However, ARM TrustZone® is designed in the early stage according to a principle that the TEE can run only on one core (usually referred to as a core 0). This design can greatly simplify a system and meets a requirement of a previous comparatively simple application scenario. However, in the foregoing application scenarios, because high performance is required and processing logic of the biometric recognition technology is comparatively complex, a high computation capability of the TEE is required. Consequently, the early implementation solution in which the TEE runs on a single core cannot meet performance requirements of these application scenarios. If the single-core solution is used for face unlock or facial payment, user experience is poor due to a slow face unlock speed or facial payment speed.

To resolve this problem, other approaches suggest open portable (OP)-TEE that provides a simple multi-core implementation solution. As shown in FIG. 1, a plurality of CAs are allowed to initiate secure access to a plurality of TAs in parallel. Specifically, each CA may access a TEE driver by calling a TEE client library (TEE client lib) on an REE, the TEE driver sends a secure monitor call (SMC) instruction, so that each core can enter a monitor mode, where statuses of all the cores are independent of each other, then each core enters a secure mode, that is, enters the TEE, and the TEE searches a thread pool for a thread corresponding to the CA, to complete a task in the TEE. However, a quantity of cores in the TEE is directly restricted by a quantity of threads for calling the TA on the REE. When the cores are insufficient, the TEE cannot actively create a thread. In addition, in this solution, a plurality of TAs that are run in parallel are implemented based only on a simple thread pool, and unified scheduling and a load balancing mechanism are not provided. Consequently, parallel running of the plurality of TAs degrades overall system performance and increases power consumption.

SUMMARY

This application provides a method and an apparatus for implementing multiprocessing, a computer system, and the like. The method may be applied to an ARM TrustZone®-based terminal device or may be applied to another type of computer system. According to this solution, a plurality of pieces of service logic in a service having a high performance requirement can run in parallel in a TEE, and a core can be actively added onto the TEE, so that multiprocessing flexibility on the TEE is improved.

The following describes this application in a plurality of aspects. It is easy to understand that for implementations of the plurality of aspects, mutual reference may be made.

According to a first aspect, this application provides a computer system. A REE and a TEE are deployed in the computer system, a CA is deployed on the REE, and a TA is deployed on the TEE. The CA is configured to send a call request to the TA to call a function of the TA. The function of the TA includes a plurality of sub-functions. A thread creation module, a notification module, and a TEE scheduling module are further deployed on the TEE. The thread creation module is configured to create a sub-thread under calling of the TA, where the sub-thread is used to implement one of the plurality of sub-functions. The notification module is configured to trigger the REE to generate a shadow thread, where running of the shadow thread causes a core on which the shadow thread runs to enter the TEE. The TEE scheduling module is configured to schedule the sub-thread to the core for running. For example, the TA is a TA for implementing a facial recognition function (facial recognition TA), or a TA for implementing a fingerprint recognition function (fingerprint recognition TA).

It can be learned that the TA on the TEE actively creates one or more sub-threads (usually a plurality of sub-threads), and each time when one sub-thread is created, the REE is triggered, by sending a notification, to generate one shadow thread REE. The shadow thread is to be switched a core on which the shadow thread runs onto the TEE, and then the TEE scheduling module schedules the sub-thread created by the TA to the core for running. In this way, the TA on the TEE can create a sub-thread as required and actively "pull" a core onto the TA side to run the sub-thread. One or more sub-threads and a TA main thread run in parallel, so that multiprocessing on the TEE is implemented. In addition, the manner of actively "pulling" a core is more flexible and more effective in comparison with other approaches.

In some implementations, a notification processing module is further deployed on the REE, and the notification module is specifically configured to generate a notification after the sub-thread is created, and send the notification to the notification processing module, and the notification processing module is configured to create the shadow thread based on the notification, where running of the shadow thread causes the core on which the shadow thread runs to enter the TEE. For example, the notification is a software interrupt.

After the shadow thread is created and runs, the core on which the shadow thread runs enters the TEE. This is "the first time" that the shadow thread enters the TEE. After a period of time, the shadow thread may return to the REE, or may re-enter the TEE.

It should be noted that, that a shadow thread enters the REE or the TEE may be understood as that a core on which the shadow thread runs enters the REE or the TEE, or may be understood as that a core on which the shadow thread runs in the REE or the TEE or the core runs in an REE mode or TEE mode.

In some implementations, the TEE scheduling module is further configured to record a correspondence between the shadow thread and the sub-thread. Specifically, the TEE scheduling module is configured to create a first thread identifier for the sub-thread, where the first thread identifier is used to indicate a thread that accesses the sub-thread, and set a value of the first thread identifier to an identifier of the shadow thread after scheduling the sub-thread to the core for running.

The "shadow thread" may be considered as a virtual CA on the REE, the virtual CA accesses a sub-thread on the TEE, and a client/server relationship between the shadow thread and the sub-thread is established by recording the identifier of the shadow thread.

In the foregoing solution, the correspondence between the shadow thread and the sub-thread is recorded. In this way, regardless of whether the shadow thread is scheduled to another core by a scheduler on the REE, it can be ensured that when the shadow thread re-enters the TEE, the sub-thread corresponding to the shadow thread can still be scheduled to the core on which the shadow thread runs for execution.

In some implementations, the first thread identifier is included in a thread control block (TCB) corresponding to the sub-thread, and the first thread identifier is a field in the TCB.

In some implementations, the TEE scheduling module is specifically configured to, when determining that the shadow thread enters the TEE for the first time, schedule the newly created sub-thread to the core on which the shadow thread runs for running.

It is assumed herein that the shadow thread is created under the trigger of the sub-thread. Therefore, when it is determined that the shadow thread enters the TEE for the first time, the sub-thread is scheduled to the core on which the shadow thread runs for running.

In some implementations, the TEE scheduling module is further configured to, when determining that the shadow thread re-enters the TEE, schedule, based on the recorded correspondence between the shadow thread and the sub-thread, the sub-thread to a current core on which the shadow thread runs for running. The "current core" on which the shadow thread runs herein may be an original core or another core.

In some implementations, the shadow thread calls a SMC instruction to enable the core on which the shadow thread runs to enter the TEE. The core may enter the TEE for the first time or re-enter the TEE. "Re-entering" means that the core enters the TEE not for the first time. The SMC instruction includes a parameter, and the parameter is used to indicate whether the core enters the TEE for the first time or re-enters the TEE. Correspondingly, the TEE scheduling module is configured to determine, based on the parameter, that the shadow thread re-enters the TEE.

In some implementations, the TEE scheduling module is further configured to record a correspondence between the current core on which the shadow thread runs and the shadow thread.

The "current core" on which the shadow thread runs herein may be an original core or another core.

In some implementations, the TEE scheduling module is specifically configured to, after the current core on which the shadow thread runs enters the TEE, record the identifier of the shadow thread in an element corresponding to the current core in a global status array, where the global status array includes N elements, and each element corresponds to one core of the computer system, and after the current core on which the shadow thread runs leaves the TEE, clear a value of the element corresponding to the current core in the global status array.

The correspondence between the current core on which the shadow thread runs and the shadow thread is recorded, and this provides required data for scheduling. In other words, a specific current core and a specific current shadow thread are learned of, so that a corresponding sub-thread is found based on an identifier of the shadow thread, and the sub-thread is scheduled to the core for running.

In some implementations, the TEE scheduling module is specifically configured to, after the current core on which the shadow thread runs enters the TEE, record the identifier of the shadow thread in the element corresponding to the current core in the global status array, search for a target sub-thread, and schedule the target sub-thread to the current core for running, where a first thread identifier corresponding to the target sub-thread is the identifier recorded in the element corresponding to the current core in the global status array.

In some implementations, that the shadow thread returns to the REE may be triggered by an interrupt.

In some implementations, the TEE scheduling module determines that the shadow thread enters the TEE for the first time, and schedules a sub-thread that has not run (which may also be understood as a sub-thread for which a correspondence has not been established between the sub-thread and any shadow thread) to a core on which the shadow thread runs for running. The sub-thread may be indicated by a running state of a thread. For example, a newly created sub-thread is set to a specific running state. In this way, when a core is pulled onto the TEE for the first time, the sub-thread can be identified by the core and runs on the core. In some other implementations, the TEE scheduling module may identify a newly created sub-thread (a sub-thread that has not run yet) based on information that a value of the first thread identifier is null.

In some implementations, when determining that the shadow thread enters the TEE not for the first time, the TEE scheduling module determines a target sub-thread, and schedules the target sub-thread to the current core on which the shadow thread runs for running, where the first thread identifier of the target sub-thread is the identifier of the shadow thread.

In some implementations, a neural processing unit (NPU) driver is further deployed in the TEE. The NPU driver is configured to drive, under calling of the one or more sub-threads of the TA, an NPU to run.

The NPU is a dedicated neural processor, and is configured to implement large-scale complex parallel operations, especially neural-related operations. When some TAs use a complex algorithm, software may be used to implement the algorithm, or the NPU may be called for acceleration according to the method provided in this application.

The NPU driver is deployed on the TEE, so that the NPU can be called on the TEE. In addition, in the solution provided in this application, multiprocessing can be implemented on the TEE, so that the NPU can be better used on the TEE. This improves overall system performance.

In some implementations, a security storage unit and a hardware driver unit are further deployed in the TEE. The security storage unit and the hardware driver unit can be accessed only by the TEE. The hardware driver unit is configured to access corresponding hardware under calling of the one or more sub-threads of the TA. The security storage unit is configured to store data collected by the hardware. The security storage unit herein is understood as a storage area. Because the security storage unit can be accessed only by the TEE, the security storage unit is secure.

In some implementations, the secure storage unit is a buffer with a fixed size or a non-fixed size. The buffer with a non-fixed size may also be referred to as a dynamic buffer for short. In some implementations, if the hardware driver unit is a camera driver, hardware corresponding to the camera driver is a camera.

The TA directly accesses hardware on the TEE, and stores data collected by the hardware in a storage area on the TEE, so that security of using the data by the TA and security of the data are further ensured. For example, for a 3 dimension (3D) facial recognition TA, the camera driver may be deployed on the TEE by using the method provided in this application, and a face image captured by the camera is stored on the TEE. The TA may directly drive the camera on the TEE to access the face image, so that security of an entire facial recognition process is further ensured.

Manners of division into modules are not enumerated, and the modules in the first aspect of this application are merely examples, but should not constitute any limitation on the scope of this application. The method executed by all the modules deployed on the TEE may also be considered as a method executed by the TEE. Correspondingly, the method executed by all the modules deployed on the REE may also be considered as a method executed by the REE. In addition to some steps performed by hardware, the method performed by the TEE and the REE in this application may be generally considered as a method performed by operating systems or applications in the TEE and the REE.

According to a second aspect, this application provides a method for implementing multiprocessing on a TEE. The method is applied to a multi-core computer device. The method includes creating, by a TEE, a sub-thread, where the sub-thread is used to implement a sub-function of a TA deployed on the TEE, and triggering, by the TEE, a REE to generate a shadow thread, where running of the shadow thread causes a core on which the shadow thread runs to enter the TEE, and scheduling, by the TEE, the created sub-thread to the core for execution.

In some implementations, the TEE generates a notification (for example, a software interrupt) after the sub-thread is created, and sends the notification to the REE, so that the REE creates the shadow thread based on the notification.

In some implementations, the method further includes recording, by the TEE, a correspondence between the shadow thread and the sub-thread.

In some implementations, the recording, by the TEE, a correspondence between the shadow thread and the sub-thread includes recording, by the TEE, an identifier of the shadow thread in a TCB of the sub-thread.

In some implementations, the method further includes, after the running of the shadow thread causes a current core on which the shadow thread runs to enter the TEE (which may also be understood as that the shadow thread re-enters the TEE), the TEE schedules, based on the recorded correspondence between the shadow thread and the sub-thread, the sub-thread to the current core on which the shadow thread runs for running. The "current core" herein may be an original core or another core because the shadow thread may be scheduled to a different core for running.

In some implementations, the method further includes recording, by the TEE, a correspondence between the current core on which the shadow thread runs and the shadow thread. Specifically, after the current core on which the shadow thread runs enters the TEE, the identifier of the shadow thread is recorded in an element corresponding to the current core in a global status array, where the global status array includes N elements, and each element corresponds to one core of the computer system, and after the current core on which the shadow thread runs leaves the TEE, a value of the element corresponding to the current core in the global status array is set to 0.

In some implementations, the method further includes calling, by the TEE, a NPU by calling an NPU driver deployed in the TEE.

In some implementations, the method further includes accessing, by the TEE, corresponding hardware through a hardware driver unit deployed on the TEE, and storing, in a security storage unit deployed on the TEE, data collected by the hardware.

In some implementations, the TA is a TA for implementing a facial recognition function or a TA for implementing a fingerprint recognition function, or a TA for implementing both a facial recognition function and a fingerprint recognition function. The facial recognition may be specifically 3D facial recognition.

According to a third aspect, this application provides a computer system. The computer system includes a memory and a processor, the memory is configured to store a computer-readable instruction (or referred to as a computer program), and the processor is configured to read the computer-readable instruction to implement the method in any one of the foregoing implementations.

According to a fourth aspect, this application provides a computer storage medium. The computer storage medium may be a non-volatile storage medium. The computer storage medium stores a computer-readable instruction, and when the computer-readable instruction is executed by a processor, the method in any one of the foregoing implementations is implemented.

According to a fifth aspect, this application provides a computer program product. The computer program product includes a computer-readable instruction, and when the computer-readable instruction is executed by a processor, the method in any one of the foregoing implementations is implemented.

It can be learned that, according to the method and apparatus for implementing multiprocessing on the TEE, and the computer system that are provided in this application, a plurality of tasks can be executed in parallel on the TEE. For example, a plurality of sub-tasks of one TA are executed in parallel. Therefore, some complex services having comparatively high security requirements, for example, 3D facial recognition, can be all executed in parallel on the TEE. In this way, both security requirements and performance requirements of these services can be met. Further, the shadow thread is generated on the REE under the trigger of the TEE, so that a core is actively "pulled" onto the TEE. This improves multiprocessing flexibility on the TEE.

Further, based on the provided multiprocessing mechanism, an access correspondence between the CA on the REE and the TA on the TEE (that is, a CA-TA scheduling group) is recorded, so that the CA (including the shadow thread) and the corresponding TA (including the sub-thread of the TA) can run on a same core. Therefore, accuracy of CA load calculation on the REE is ensured, and overall load balancing of a system can be better implemented.

Further, the NPU is deployed on the TEE, so that service execution efficiency is further improved based on the multiprocessing running solution and an acceleration capability of the NPU.

Further, data required by a service is stored in a secure storage medium on the TEE, so that security of the data can be further ensured. Therefore, security of the service is ensured.

BRIEF DESCRIPTION OF DRAWINGS

To describe the technical solutions provided in this application more clearly, the following briefly describes the accompanying drawings. It is clearly that the accompanying drawings in the following description show only some embodiments of this application.

DESCRIPTION OF EMBODIMENTS

Figure 1:
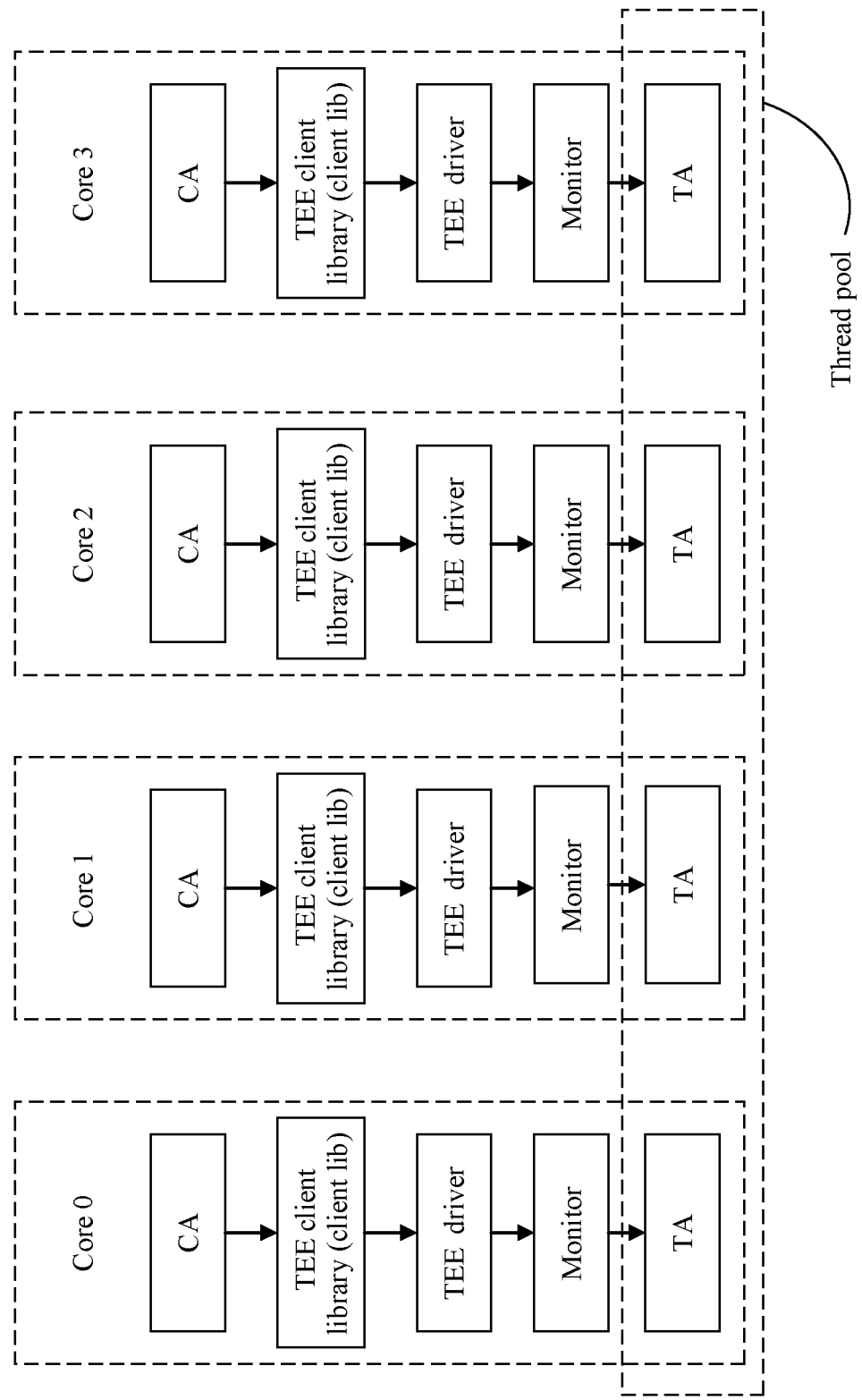
FIG. 1 is a schematic diagram of a multi-core solution on a TEE in other approaches.

Before the embodiments are described, several concepts that may be used in the embodiments are first described. It should be understood that the following explanations of the concepts may be limited due to a specific case in the embodiments, but this does not indicate that this application is limited to the specific case. The following explanations of the concepts may also vary with a specific case in different embodiments.

Multi-core scheduling is a scheduling mechanism in which operations of task creation, scheduling, migration, and exiting that are performed on a plurality of cores are supported, where the scheduling mechanism is provided by a computer system including a multi-core processor.

Load balancing means that a plurality of tasks running in parallel on a multi-core processor need to be distributed to different cores in a balancing manner to achieve system load balancing, so as to improve overall system performance and reduce power consumption.

A task is a general concept in this application. Any work to be done by a computer may be referred to as a task, e.g. a process, a thread, a sub-thread, a CA, a TA, or a service.

A thread is sometimes referred to as a light-weight process (LWP), and is a smallest unit of a program execution flow. Entities of a thread include a program, data, and a TCB. The thread is a dynamic concept, and a dynamic feature of the thread is described by using a TCB. The TCB may include the following information a thread status, stored context when the thread is not running, a group of execution stacks, a main memory area in which a local variable of each thread is stored, a main memory accessing a same process, and another resource. Some changes are made to the TCB in the embodiments.

Interrupt request (IRQ). An IRQ generally refers to an event generated by hardware or software. The hardware sends the event to a processor. When receiving the event, the processor temporarily stops execution of a current program and executes a program corresponding to the event. IRQs include a software interrupt and a hardware interrupt. An interrupt generated by hardware (for example, a network adapter, a hard disk, a keyboard, or a mouse) for a processor is usually referred to as a hard interrupt or a hardware interrupt (sometimes also referred to as an interrupt). The software interrupt is generally generated by a process currently running on the processor. A processing process of the software interrupt is similar to a processing process of the hardware interrupt. The processing process of the software interrupt is as follows. After a software interrupt occurs, a corresponding interrupt flag is first set to trigger an interrupt transaction, then a daemon thread is woken up to detect an interrupt status register, and if it is found, through query, that a software interrupt occurs, a corresponding software interrupt service program is called by querying a software interrupt vector table. A difference between the processing process of the software interrupt and the processing process of the hardware interrupt lies in a mapping process from an interrupt flag to an interrupt service program. After the hardware interrupt occurs, the processor needs to map a hardware IRQ to a specific service program based on a vector table. This process is automatically completed by hardware. However, for the software interrupt, this process is different, because the daemon thread is required to implement this process for the software interrupt. In other words, software imitates hardware to implement the processing process for the interrupt. Therefore, the interrupt is referred to as a software interrupt.

A completely fair scheduler (CFS) scheduler is a completely fair scheduling program that is implemented as a scheduling module in a kernel of a Linux® operating system.

Figure 2:
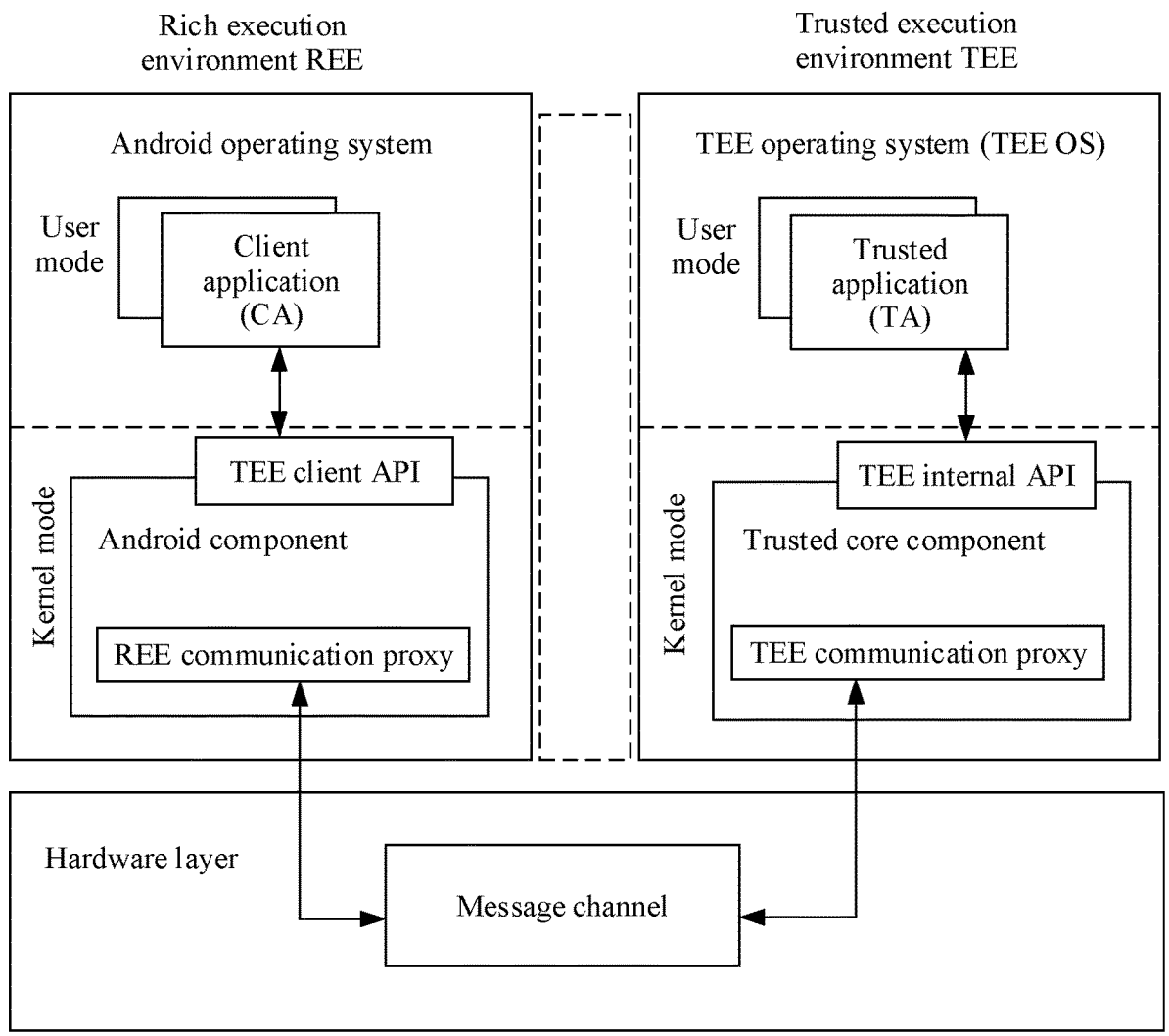
FIG. 2 is a schematic structural diagram of a terminal device according to an embodiment of this application.

FIG. 2 is a schematic structural diagram of a terminal device according to an embodiment of this application. The terminal device may be a desktop computer, a notebook computer, a mobile phone, a tablet computer, a smartwatch, a smart band, or the like. A TrustZone® system is deployed on the terminal device. The system includes an REE and a TEE. A Linux® operating system and a TEE operating system (for example, an open-source OP-TEE operating system) are run in the REE and the TEE respectively. The Linux® operating system and the TEE OS each have a user mode and a kernel mode. A plurality of CAs such as a facial recognition CA and a fingerprint recognition CA are deployed in the user mode on the REE. A plurality of TAs such as a fingerprint recognition TA and a facial recognition TA are deployed in the user mode on the TEE. An Android® component is deployed in the kernel mode on the REE, and a trusted core component is deployed in the kernel mode on the TEE. The CA in the REE and the TA in the TEE constitute an architecture similar to a client/server architecture, where the CA serves as a client, and the TA serves as a server. The CA initiates an access operation, and the CA and the TA exchange data through an REE communication proxy, a message channel at a hardware layer, and a TEE communication proxy. A secure communication channel is established between the CA and the TA through the REE communication proxy, the message channel at the hardware layer, and the TEE communication proxy, so that security of data transmission is ensured to some extent. Specifically, the CA calls a TEE client application program interface (API) to communication with a corresponding TA, and the TA calls a TEE internal API to use a programming resource provided by the TEE, so as to implement a related function.

Figure 3:
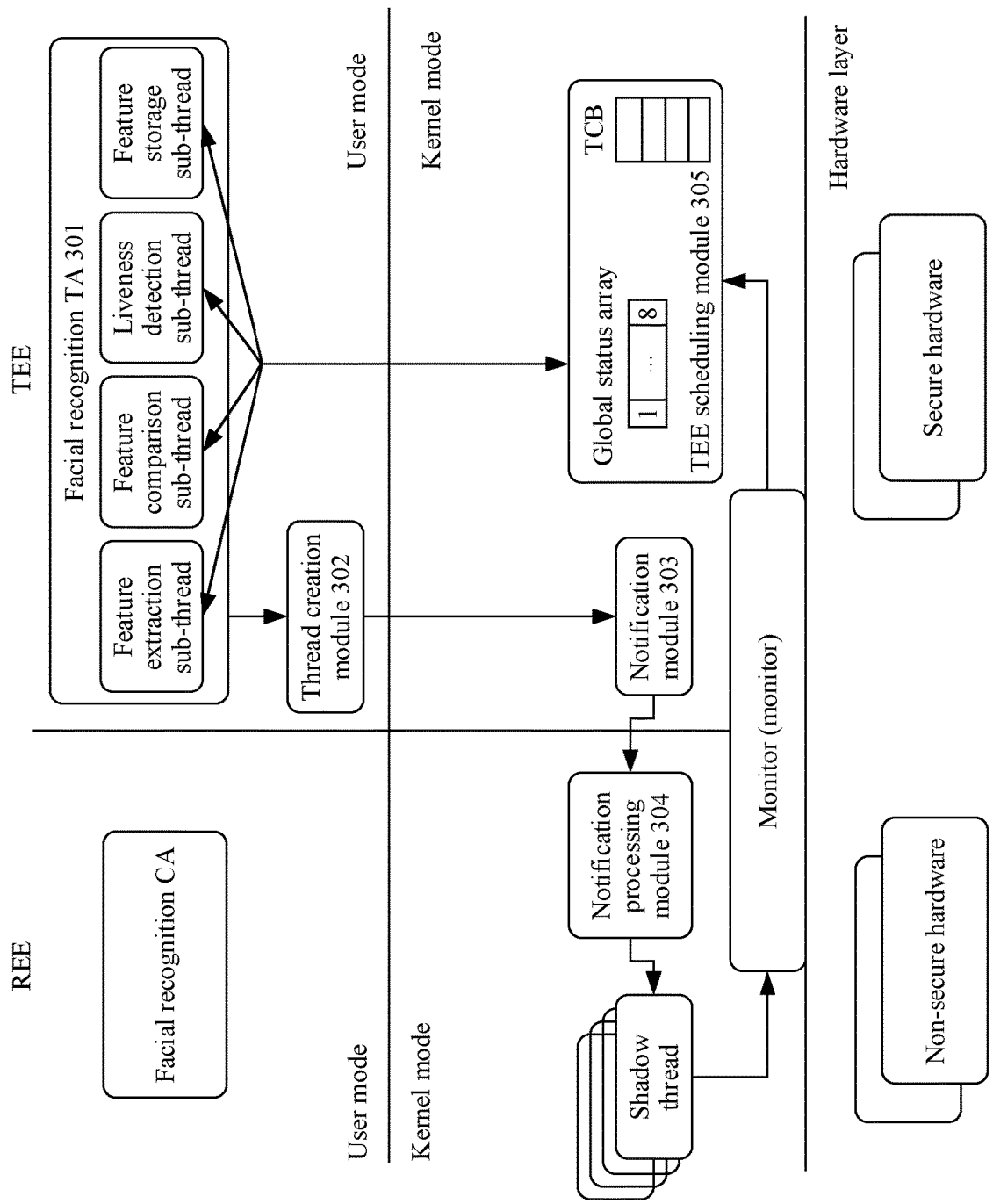
FIG. 3 is a schematic diagram of deployment of a multiprocessing solution on a TEE according to an embodiment of this application.

FIG. 3 is a schematic diagram of deployment of a multiprocessing solution on a TEE according to an embodiment. In this embodiment, a facial recognition CA and a facial recognition TA 301 are used as examples to describe the technical solution. The facial recognition CA and the facial recognition TA 301 are deployed on an REE and a TEE respectively. The facial recognition CA and the facial recognition TA 301 work cooperatively to implement a facial recognition service such as face verification that is widely applied in scenarios such as terminal unlocking, application login, and financial payment. In this embodiment, the facial recognition TA 301 may have the following four sub-functions feature extraction, feature comparison, liveness detection, and feature storage. In some other embodiments, the facial recognition TA may include more, fewer, or other types of sub-functions. This is not limited in this application.

Further, the facial recognition TA 301, a thread creation module (for example, libthread) 302, a notification module 303, and a TEE scheduling module 305 are deployed on the TEE. A notification processing module 304 is deployed on the REE. A monitor is an existing module provided by a TrustZone® system, and is configured for switching from the REE to the TEE. The thread creation module 302 is configured to create a sub-thread under calling of the facial recognition TA 301, and call the notification module 303 to generate a software interrupt. The notification module 303 is configured to generate the software interrupt and send the software interrupt to the notification processing module 304 on the REE. The notification processing module 304 is configured to receive the software interrupt and create a shadow thread, where the created shadow thread is scheduled to a core for running. Then, the shadow thread enters the TEE by sending an SMC instruction, and this is equivalent to that the core on which the shadow thread runs enters the TEE (that is, a secure mode).

In this embodiment, secure hardware and non-secure hardware are further deployed at a hardware layer. The secure hardware is hardware that can be accessed only by the TEE. The non-secure hardware is hardware that can be accessed by both the REE and the TEE or hardware that can be accessed only by the REE.

Figure 4A:
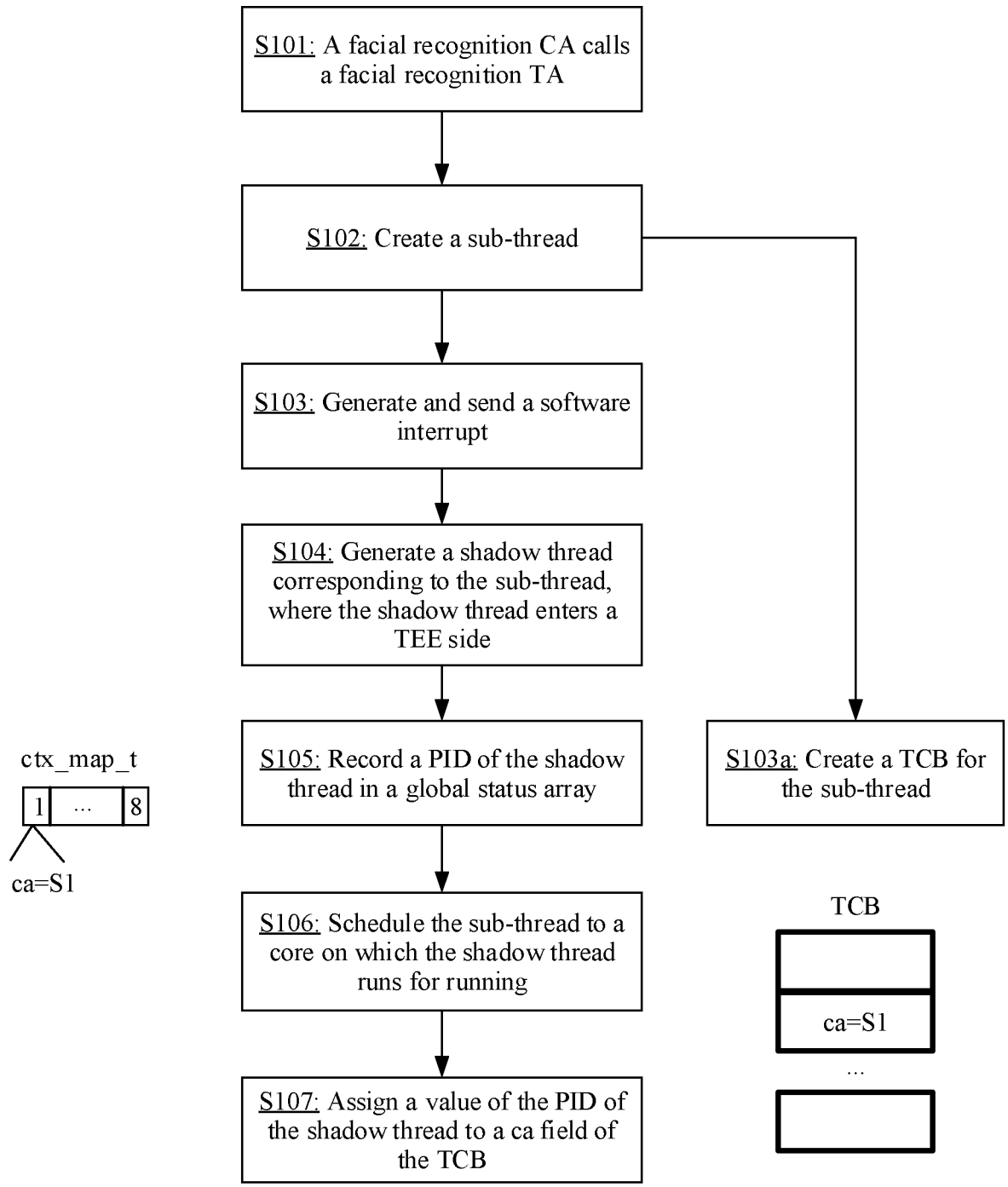
FIG. 4A and FIG. 4B are schematic diagrams of a multiprocessing solution on a TEE according to an embodiment of this application.
Figure 4B:
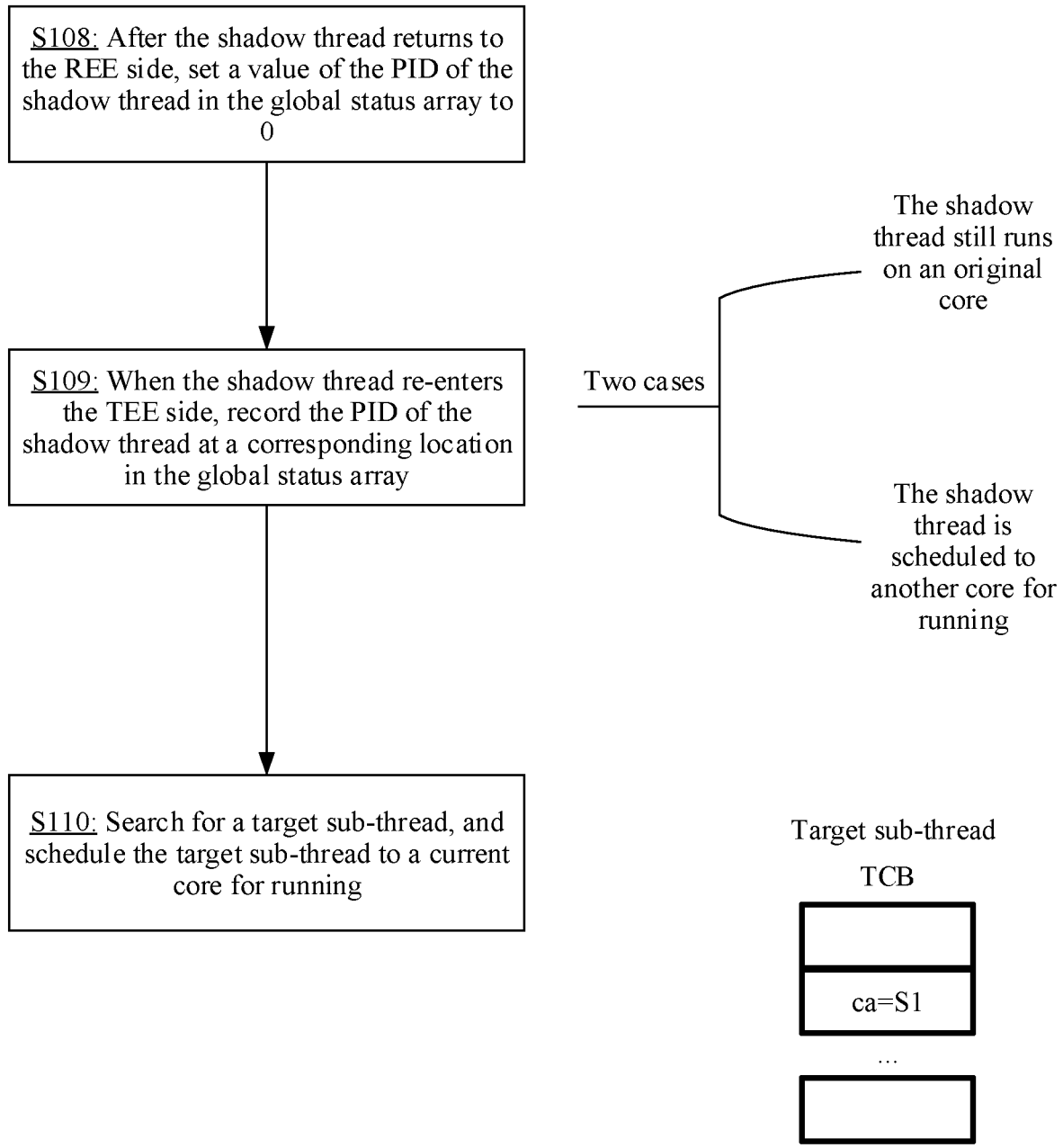

FIG. 4A and FIG. 4B are schematic diagrams of a method of a multiprocessing solution on a TEE according to an embodiment. The following describes an implementation process of the solution in detail based on FIG. 3, FIG. 4A, and FIG. 4B.

S101. The facial recognition CA sends a call request to the facial recognition TA 301 on the TEE according to an SMC instruction provided by TrustZone®. This process is another approach, and is not described in detail in this application. For ease of understanding, the process may be understood as follows. A core on which the facial recognition CA runs enters a TEE (a secure mode) according to the SMC instruction provided by TrustZone®, and the facial recognition TA starts to run in the secure mode to implement a function of the facial recognition TA.

S102. After receiving the call request, the facial recognition TA 301 creates one sub-thread T1. Specifically, the facial recognition TA 301 creates the sub-thread T1 through a pthread_create interface in the thread creation module 302 (for example, libthread).

In this embodiment, the facial recognition TA finally creates four sub-threads T1 to T4. The four sub-threads respectively process four sub-functions feature extraction, feature comparison, liveness detection, and feature storage. In this embodiment, creation and running of one sub-thread are used as an example for description. For creation and running processes of the other three sub-threads, refer to the creation and running of the sub-thread.

S103. After creating the sub-thread T1, the thread creation module 302 calls the notification module 303 to generate a software interrupt, and the notification module 303 sends the software interrupt to the notification processing module 304 on the REE.

S103a. The TEE scheduling module 305 creates a corresponding task control data structure, that is, a TCB, for the sub-thread T1.

For example, a structure of the TCB is shown as follows

```
struct tcb   /* struct tcb refers to a thread control data structure,
and each TEE thread corresponds to one thread control data structure. */
    {
    ......
    thread_states state;                    /* task running state */
    sched_policy_t sched_policy;            /* task scheduling policy */
    ...
    struct tcb_prop {                       /* TCB property */
        char tcb_name[TCB_NAME_SIZE];       /* TCB name */
        ......
        uint64_t ca;                        /* process identifier (PID)
of a CA that accesses the sub-thread */
    }
    }.
```

The "task" refers to a sub-thread, and a TCB of each sub-thread includes a running state, a scheduling policy, a TCB name, and the like. The English identifier before each field indicates a type of a value of the field. A running state of a newly created sub-thread is set to a specific running state. For example, state=000 indicates that the sub-thread waits for a new core for execution.

The TCB provided in this embodiment includes a ca field, and the ca field is an implementation of a "first thread identifier" proposed in this application. A value of the ca field may be 0 by default.

S104. The notification processing module 304 generates a thread S1 after receiving the software interrupt, where a PID of the thread S1 is S1, and the thread S1 enters the TEE by sending an SMC instruction.

The thread is referred to as a shadow thread in the following in this embodiment, and is essentially the same as a common thread, except that a function to be implemented by the shadow thread is special in this embodiment. For the facial recognition TA 301, only the facial recognition CA accesses the facial recognition TA 301. However, in this embodiment, the facial recognition TA 301 is completed by a plurality of threads instead of one thread. Therefore, the shadow thread may be understood as a "virtual CA" that accesses a sub-thread.

It is easy to understand that "a thread enters a TEE" herein means that "a core on which the thread runs enters the TEE", or "a core on which the thread runs enters a TEE mode (or the secure mode)". There are some abstract descriptions about software, it is similar for a TrustZone® technology, and descriptions may be different in a same case.

It should be noted that the "core" in this application is a smallest physical processing unit.

Specifically, the SMC instruction sent by the shadow thread may include a parameter, and the parameter is used to indicate that the shadow thread enters the TEE for the first time. For example, the parameter may be firstIn. When firstIn=true, it indicates that the shadow thread enters the TEE for the first time. When firstIn=false, it indicates that the shadow thread enters the TEE not for the first time. Alternatively, the shadow thread includes a parameter when sending the SMC instruction only for the first time, and does not include the parameter in other cases. In this way, a receiver may determine, based on information whether the parameter exists or not, whether the shadow thread enters the TEE for the first time.

S105. After the shadow thread S1 enters the TEE, that is, after a core on which the shadow thread S1 runs enters the TEE, the TEE scheduling module 305 records the PID of the shadow thread S1 at a location of the core in a global status array.

For example, the global status array ctx_map_t[CPU_NUM] is shown as follows

```
ctx_map_t [CPU_NUM]   /* ctx_map_t [CPU_NUM] indicates
an REE&TEE switching state, and CPU_NUM indicates a quantity of
cores. */
{
    uint64_t ops;          /* type of an operation of entering
the TEE from the REE */
    uint64_t ca;           /* PID of the CA that enters the
TEE */
    uint64_t ta;           /* TA accessed this time */
    uint64_t exit_reason;  /* type of a reason for exiting from
the TEE */
    uint64_t flags;        /* other flags */
}.
```

The "CPU" refers to the foregoing described "core". In this embodiment, the core on which the shadow thread S1 runs is a core numbered 1 (which is referred to as a core 1 in the following), and the TEE scheduling module 305 records the PID of the shadow thread S1 at a ca field of ctx_map_t[1]. In other words, if ca=S1, it indicates that a (virtual) CA that enters the TEE this time is the shadow thread S1.

S106. When determining that the shadow thread S1 enters the TEE for the first time, the TEE scheduling module 305 searches for the sub-thread T1 in the specific running state, that is, state=000, and schedules the sub-thread T1 to a current core, that is, the core 1, on which the shadow thread runs, for running.

S107. Further, the TEE scheduling module 305 assigns the value (that is, S1) of the ca field of ctx_map_t[1] to a ca field of a TCB corresponding to the sub-thread T1, so that a CA-TA group in which the shadow thread S1 and the sub-thread T1 are respectively used as a CA and a TA is established.

The foregoing steps S101 to S107 are a process in which the shadow thread is created for the first time and enters the TEE for the first time. By repeating the foregoing steps S102 to S103, S103a, and S104 to S107, the other three sub-threads and other three corresponding shadow threads each may be created and other three CA-TA groups each may be constituted. In this way, a plurality of cores run on the TEE at the same time, and perform the four sub-functions of the facial recognition TA 301 at the same time, so that efficiency of executing the facial recognition TA is greatly improved.

Further, according to the foregoing method, the TEE actively "pulls" a core onto the TEE, so that a sub-thread can be actively executed on the TEE that is used as a passive operating system. This improves multiprocessing flexibility on the TEE.

Similar to a common CA, the shadow thread S1 may be interrupted and return to the REE during running, and may be scheduled to another core on the REE. In this case, referring to FIG. 4B, the following operations need to be performed to ensure that the sub-thread T1 and the shadow thread S1 still run on a same core.

S108. After the shadow thread (that is, the core 1) returns to the REE, the TEE scheduling module 305 sets the value of the ca field of ctx_map_t[1] to 0.

S109. When the shadow thread S1 re-enters the TEE, the TEE scheduling module 305 sets the ca field at the corresponding location in the global status array to S1.

Specifically, if the shadow thread S1 that re-enters the TEE still runs on the core 1, the TEE scheduling module 305 still sets the ca field of ctx_map_t[1] to S1. If the shadow thread S1 on the REE is scheduled by a scheduling module (for example, a CFS scheduler) on the REE to another core for running, for example, a core 2, the TEE scheduling module 305 sets a ca field of ctx_map_t[2] to S1.

S110. The TEE scheduling module 305 searches for a target sub-thread, and schedules the target sub-thread to the current core for running.

The target sub-thread needs to meet the following condition. A ca field in a TCB of the target sub-thread is the same as the ca field corresponding to the current core in the global status array, that is, the ca fields are both S1 in this embodiment. It can be learned that in this embodiment, the target sub-thread is the sub-thread T1. Therefore, the sub-thread T1 is scheduled to the current core for running. The "current core" may be the core 1 or the core 2 based on the description in step S109.

It is easy to understand that only a target sub-thread that is in an executable state can be scheduled to a core for execution in this embodiment. If the target sub-thread is in a non-executable state, the TEE scheduling module 305 may enable, according to a scheduling policy, the core 1 or the core 2 to wait or to execute another executable process. This is not limited in this application.

Figure 5:
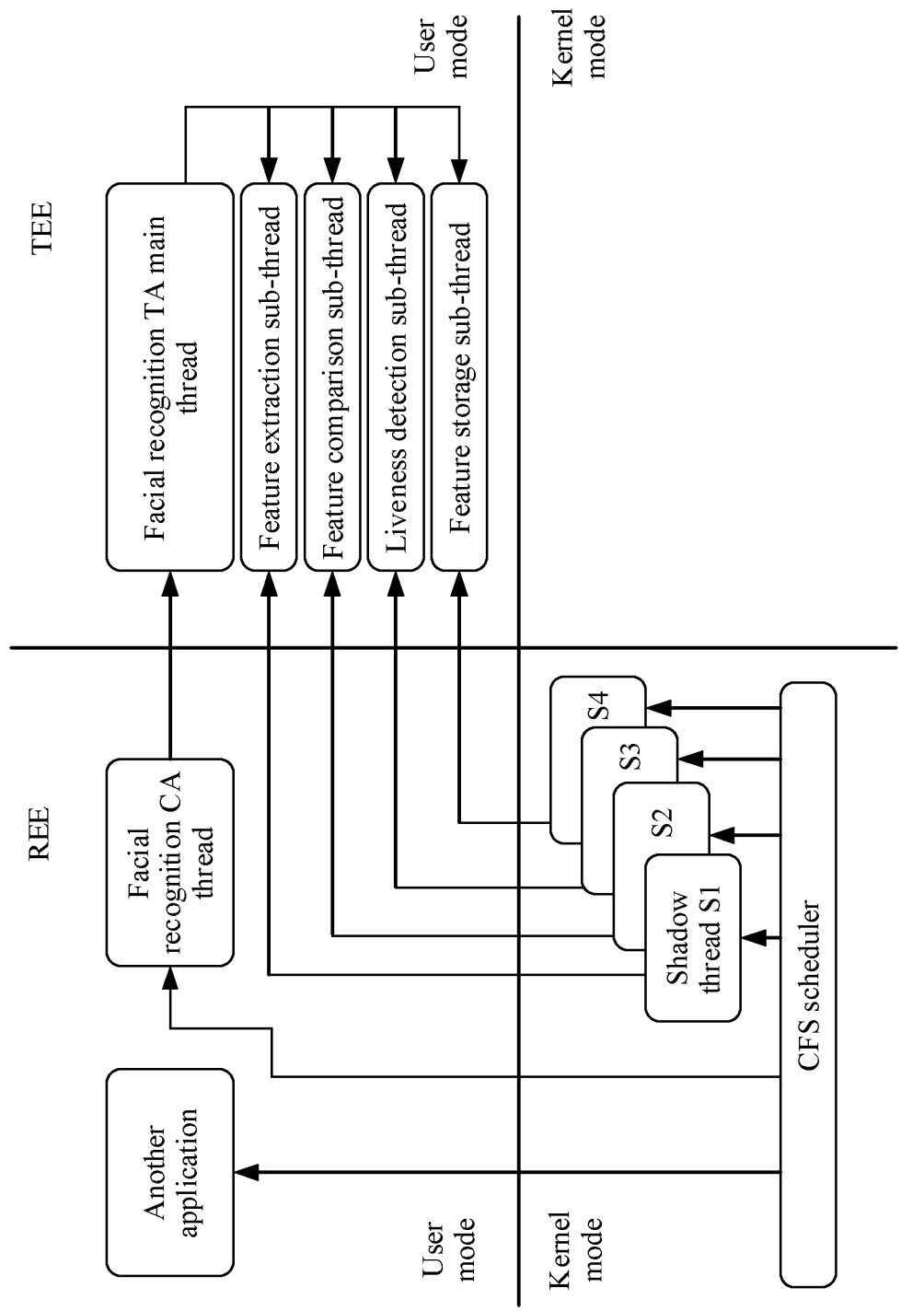
FIG. 5 is a schematic diagram of a plurality of CA-TA scheduling groups according to this application.

FIG. 5 shows a plurality of CA-TA scheduling groups constituted after the method provided in this application is implemented. It can be learned from the figure that a facial recognition TA main thread and the facial recognition CA constitute one scheduling group, and the other four sub-threads together with the shadow threads S1 to S4 respectively constitute four scheduling groups. The five scheduling groups and another application together participate in a scheduling process of load balancing performed by the CFS scheduler.

It can be learned that, according to the solution provided in this embodiment, even if a shadow thread is scheduled to another core for running, it can be ensured that a sub-thread corresponding to the shadow thread on the TEE can be scheduled to a same core for running. In this way, the shadow thread and the corresponding sub-thread are used as a CA-TA scheduling group that is to be scheduled as an entirety, thereby ensuring accuracy of CA load calculation.

The following describes another scenario in this application. In this scenario, dual authentication facial recognition and fingerprint recognition, needs to be performed. In this scenario, a CA and a TA can be scheduled as an entirety according to the multiprocessing solution provided in this application.

Figure 6:
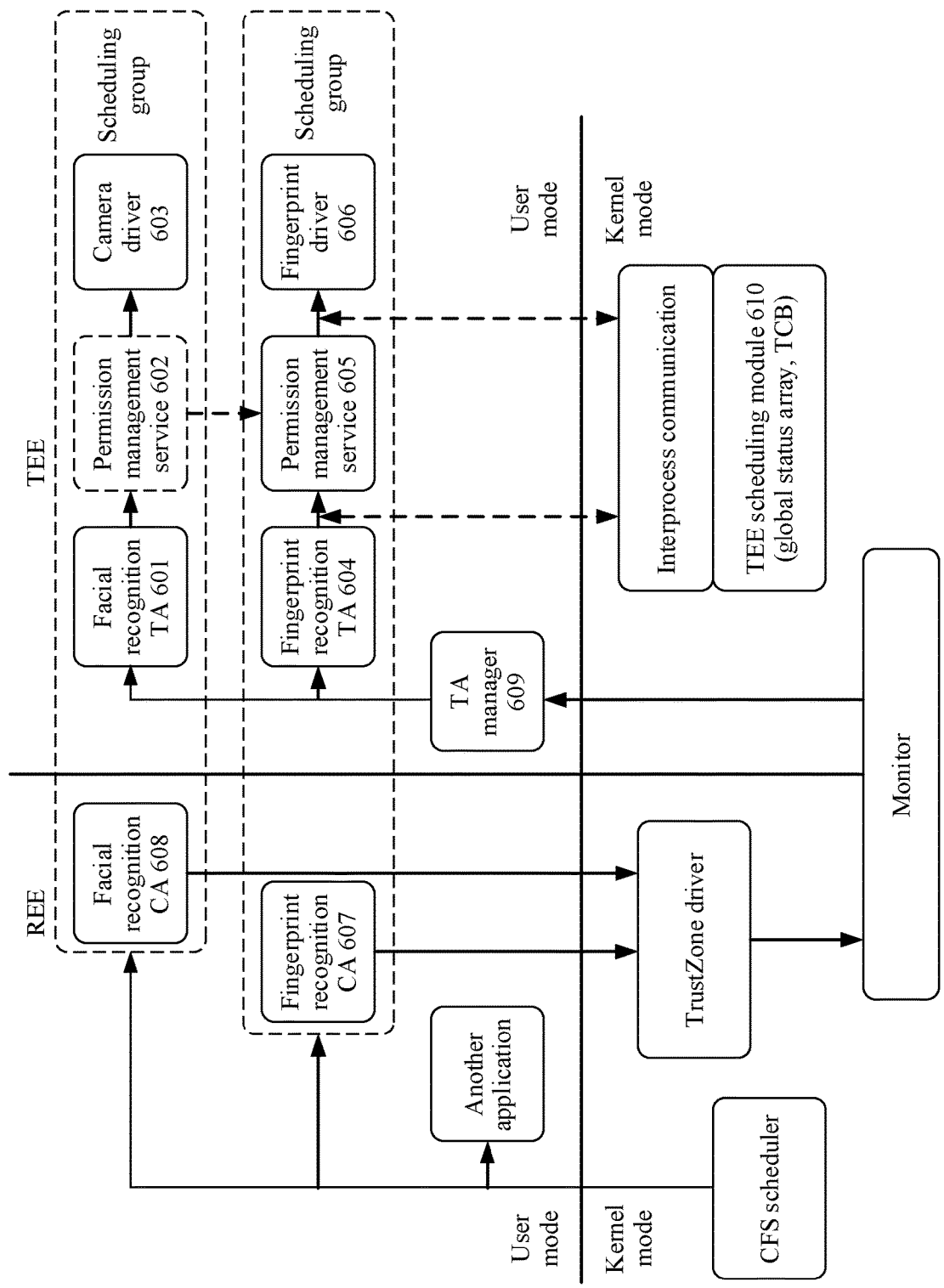
FIG. 6 is a schematic diagram of a terminal system for implementing dual authentication face authentication and fingerprint authentication according to an embodiment of this application.

FIG. 6 is a schematic diagram of a terminal system for implementing dual authentication face authentication and fingerprint authentication according to an embodiment. A solution to implementing the dual authentication is described as follows.

A facial recognition CA 608 and a fingerprint recognition CA 607 on an REE each initiate a request to a TEE. The facial recognition CA 608 and the fingerprint recognition CA 607 each initiate the request in the following manner. A central processing unit (CPU) enters a monitor mode by calling a monitor through a TrustZone® driver, and then the CPU enters a TEE mode from the monitor mode. Then, a TA manager 609 determines, based on information carried in the request, that a facial recognition TA 601 and a fingerprint recognition TA 604 process the request from the facial recognition CA and the request from the fingerprint recognition CA respectively.

It is easy to understand that the facial recognition CA and the fingerprint recognition CA are essentially two threads and respectively run on two cores. After the foregoing steps, the two cores both enter the TEE.

A TEE scheduling module 610 records a PID of the facial recognition CA and a PID of the fingerprint recognition CA at respective locations corresponding to the two cores in a global status array, and records the PID of the facial recognition CA 608 in a ca field of a TCB of the facial recognition TA 601 and records the PID of the fingerprint recognition CA 607 in a ca field of a TCB of the fingerprint recognition TA 604. In this way, two CA-TA scheduling groups are established, and load of a TA on the TEE may be added to load of the corresponding CA.

In addition, the TA usually further requests another service process and/or driver process for implementation. A CA-TA scheduling group is also to be established for these processes that are indirectly accessed. The facial recognition TA 601 calls a permission management service 602 by sending a message, and the permission management service 602 calls a camera driver 603. Similarly, the fingerprint recognition TA 604 calls a permission management service 605, and the permission management service 605 calls a fingerprint driver. In this embodiment, the permission management service 602 and the permission management service 605 are a same service. In another embodiment, the two services may be alternatively two independent services.

The foregoing "calling" essentially refers to interprocess communication (IPC). An IPC mechanism in the TEE is implemented based on a message. In this embodiment, during message transfer, a value of a ca field in a TCB of a message initiator is transferred to a message receiver. Therefore, all service processes on a calling chain of the TA are correspondingly pulled into corresponding CA-TA scheduling groups. As shown in FIG. 5, two scheduling groups are constituted in this embodiment.

When a service process receives, after processing a message from a TA, a message from another TA, the service process updates a value of the ca field with the new message and the value is carried to another CA-TA group. As shown in the figure, the permission management service 602 may switch from a facial recognition CA-TA scheduling group to a fingerprint recognition CA-TA scheduling group.

Specifically, the facial recognition TA 601 sends a message to the permission management service 602, and transfers the value of the ca field in the TCB of the facial recognition TA 601, that is, the PID of the facial recognition CA, to the permission management service 602. A value of a ca field in a TCB of the permission management service 602 is also set to the PID of the facial recognition CA 601. Then, the permission management service 602 is called by the fingerprint recognition TA 604, and the value of the ca field in the TCB of the permission management service 602 (which is equivalent to the permission management service 605 in the figure) is reset to the PID of the fingerprint recognition CA.

One CA-TA scheduling group is used as one scheduling unit and is scheduled as an entirety by a CFS scheduler on the REE, and the scheduling may be triggered by a load balancing requirement. For example, if a CA is scheduled to another core by the CFS scheduler, a TA in a scheduling group in which the CA is located and another process called by the TA are also scheduled to the core by the TEE scheduling module 610. Therefore, according to the method provided in this application, a CA and a corresponding TA are scheduled as an entirety when a plurality of TAs run in parallel, thereby ensuring accuracy of CA load calculation. For example, if the facial recognition CA 608 is scheduled to another core but the facial recognition TA 601 is not scheduled to the core, and load of another thread running on the core is added to load of the facial recognition CA 608. However, this is incorrect.

Further, a case similar to S108 may also exist in this scenario. For example, when an IRQ occurs, a core on which the facial recognition TA 601 runs is interrupted and returns to the REE to respond to the IRQ. When the core exits, the TEE scheduling module 610 sets a value of a ca field corresponding to the core in the global status array to 0. If the facial recognition CA 608 is scheduled by the CFS scheduler on the REE to a new core for running, and then re-enters the TEE, the TEE scheduling module 610 sets a ca field corresponding to the new core in the global status array to the PID of the facial recognition CA 608. The TEE scheduling module 610 searches for a target task based on the PID of the facial recognition CA 608, and a ca value in a TCB field of the target task is also the PID of the facial recognition CA 608. It can be learned from the description in the foregoing embodiment that the target task includes one or more of the facial recognition TA 601, the camera driver 603 (process), and the permission management service 602 (process). The permission management service may not belong to the target task because the ca field of the permission management service may be modified due to calling of the fingerprint recognition TA 604. Then, the TEE scheduling module 610 schedules the target task to the new core for running, so that the TA and a service called by the TA are migrated between cores. This implements that an entire CA-TA scheduling group is migrated, thereby ensuring that tasks included in the CA-TA scheduling group run on a same core.

Figure 7:
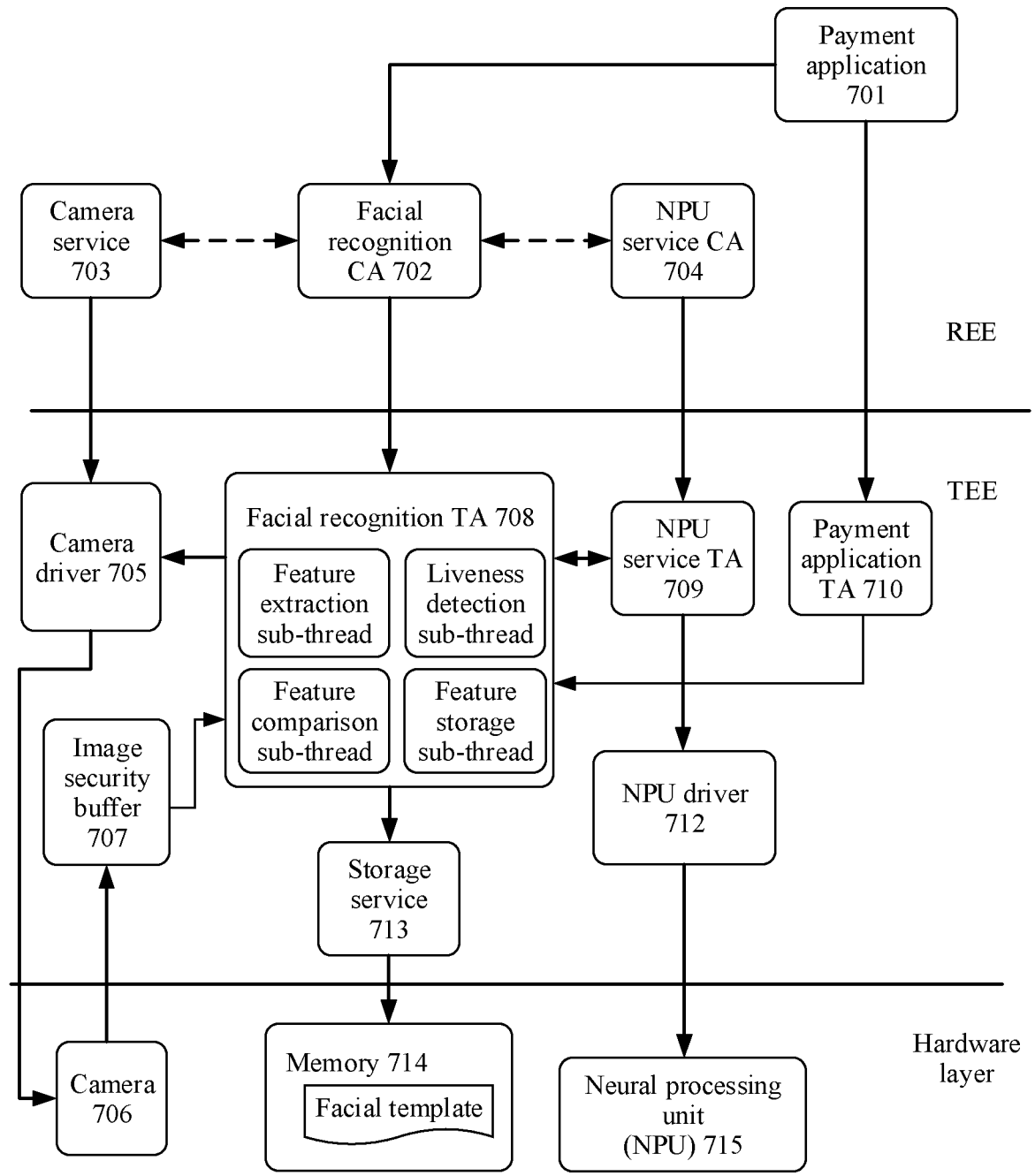
FIG. 7 is a schematic diagram of a payment solution according to an embodiment of this application.

FIG. 7 is a schematic diagram of a payment solution according to an embodiment. In the payment solution, in addition to the method for implementing multiprocessing on the TEE in the foregoing embodiment, a NPU and another manner are further used to improve security and performance.

The payment solution includes a plurality of pieces of service logic a payment application 701, a facial recognition CA 702, a facial recognition TA 708, and a camera service 703 that are triggered by the payment application, and the like. The facial recognition TA 708 further includes four pieces of sub-service logic feature extraction, liveness detection, feature comparison, and feature storage. Hardware used in this solution includes a camera 706, a NPU 715, a memory 714, a central processing unit (not shown), and the like. A driver of the camera 706, a driver of the NPU 715, and a driver of the memory 714 are deployed on the TEE. The camera service 703, the facial recognition CA 702, and an NPU service CA 704 on the REE are responsible only for initiating a service and processing some non-crucial service logic.

It should be noted that the driver of the camera 706 is deployed on the TEE in this embodiment, but the driver of the camera 706 may alternatively be deployed on the REE, so that an application or a service on the REE accesses the camera 706 through the driver.

Specifically, after the payment application 701 initiates a facial payment authentication request, the facial recognition CA 702 in the REE calls the facial recognition TA 708 on the TEE, to initiate a facial recognition procedure. The facial recognition TA 708 accesses the camera 706 through the camera driver 705 on the TEE. Specifically, the facial recognition TA 708 may drive an image signal processor (ISP) through a driver of the ISP to access the camera 706.

Then, an image captured by the camera 706 is stored in an image security buffer 707, and an access address of the image security buffer 707 is returned to the facial recognition TA 708. The image security buffer 707 may be understood as software on the TEE, or may be understood as storage space (for example, a memory) that can be accessed only by the TEE. The facial recognition TA 708 accesses the image security buffer 707 based on the address, and executes algorithms such as feature extraction, liveness detection, feature comparison, and feature storage for the captured image based on information such as a prestored facial template.

In other approaches, the camera driver is usually deployed only on the REE, some functions, for example, feature extraction, of the facial recognition TA are deployed on the REE, and when the feature extraction function is executed, the camera driver is called on the REE to capture an image REE. However, in the foregoing manner provided in this embodiment, the facial recognition TA 708 can directly access the camera 706 through the camera driver 705 that is deployed on the TEE, and buffer the image in the image security buffer 707 on the TEE, so as to ensure that both use of the camera and storage of data are completed on the TEE. This further ensures data security.

During algorithm execution, the facial recognition TA 708 accesses an NPU driver 712 through the NPU service TA 709 on the TEE, and then calls the NPU 715 through the NPU driver 712 to increase a processing speed. Finally, the payment application 701 obtains a final facial recognition result through a payment application TA 710 of the payment application 701. For example, an Alipay application obtains a final facial recognition result through the internet finance authentication alliance (IFAA) TA.

The facial template is recorded on a terminal device in advance. Payment application is completed only when a face image captured during payment matches the facial template. Therefore, security of the facial template is extremely important. In this embodiment, the facial template is stored in the memory 714 through the storage service 713 on the TEE, to prevent the facial template from being tampered with. The memory 714 may be a memory with a specific security feature, for example, a replay protected memory block (RPMB). The memory may be set to be accessed only by a TEE-side service, so that security of the memory is further improved, security of the facial template is ensured, and further, security during facial recognition is ensured.

The facial recognition solution implemented by using the method provided in this application can meet both a security requirement and a high performance requirement. A difference from other approaches in which some crucial service logic in facial recognition is implemented on the REE (for example, liveness detection is implemented on the REE) to improve facial recognition efficiency lies in that, in the solution provided in this application, all crucial service logic in facial recognition is implemented on the TEE, and facial recognition efficiency is improved through multiprocessing, so as to meet the performance requirement. In addition, data (for example, an image) generated or used during facial recognition is stored on the TEE, to further improve facial recognition security by using a security assurance mechanism of the TEE.

Figure 8:
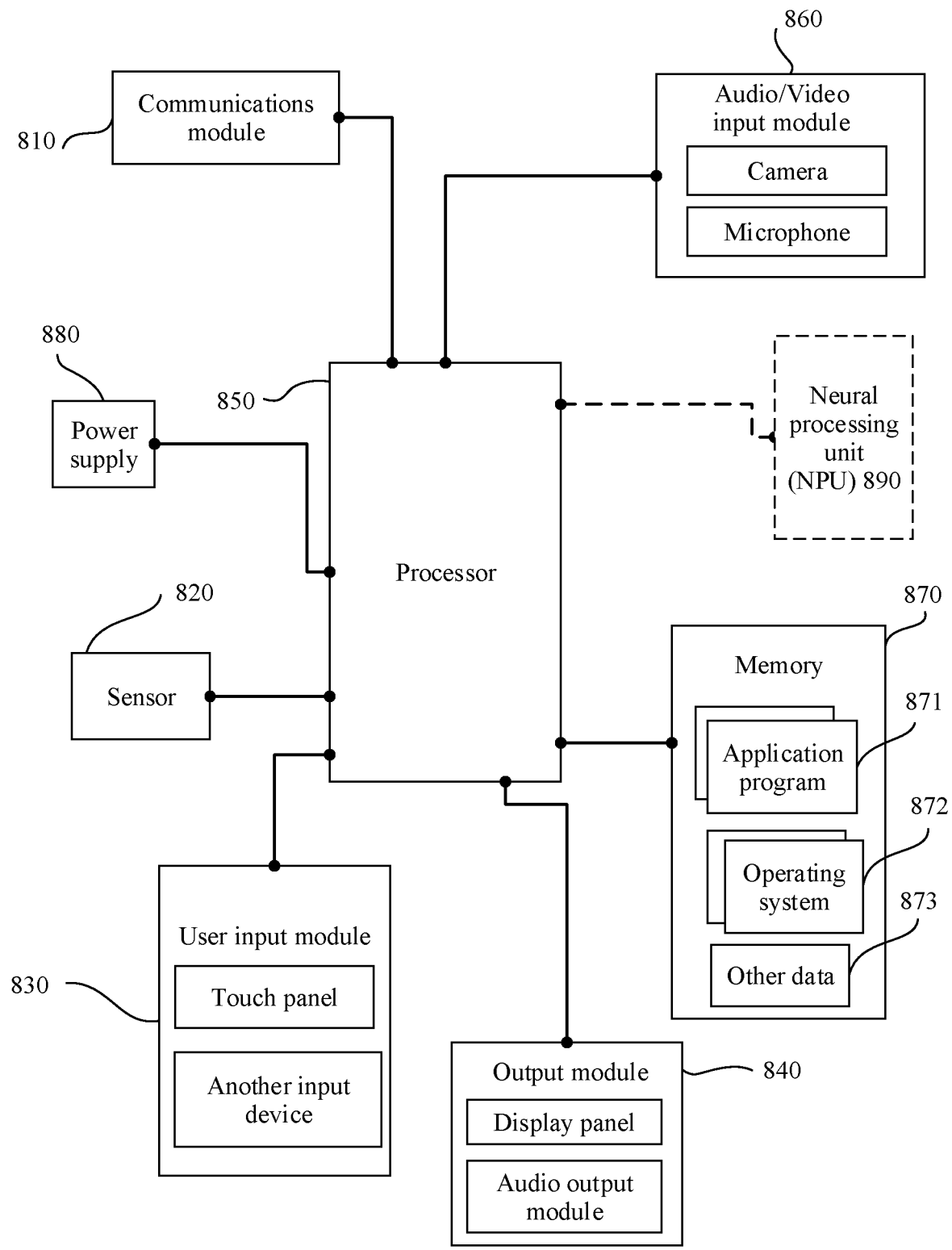
FIG. 8 is a schematic structural diagram of a computer system according to an embodiment of this application.

FIG. 8 is a schematic structural diagram of a computer system according to an embodiment. The computer system may be a terminal device. As shown in the figure, the computer system includes a communications module 810, a sensor 820, a user input module 830, an output module 840, a processor 850, an audio/video input module 860, a memory 870, and a power supply 880. Further, the computer system provided in this embodiment may further include an NPU 890.

The communications module 810 may include at least one module that can enable the computer system to communicate with a communications system or another computer system. For example, the communications module 810 may include one or more of a wired network interface, a broadcast receiving module, a mobile communications module, a wireless internet module, a local-area communications module, and a location (or positioning) information module. The plurality of modules each have a plurality of implementations in other approaches, and details are not described one by one in this application.

The sensor 820 can sense a current status of the system, for example, an on/off state, a location, whether the system is in contact with a user, an orientation, and acceleration/deceleration. In addition, the sensor 820 can generate a sense signal used to control an operation of the system.

The user input module 830 is configured to receive input number information, character information, or a contact touch operation/contactless gesture, and receive a signal input related to user settings and function control of the system, and the like. The user input module 830 includes a touch panel and/or another input device.

The output module 840 includes a display panel, configured to display information input by the user, information provided for the user, various menu interfaces of the system, and the like. Optionally, the display panel may be configured in a form of a liquid-crystal display (LCD), an organic light-emitting diode (OLED), or the like. In some other embodiments, the touch panel may cover the display panel, to form a touch display screen. In addition, the output module 840 may further include an audio output module, an alarm, a tactile module, and the like.

The audio/video input module 860 is configured to input an audio signal or a video signal. The audio/video input module 860 may include a camera and a microphone.

The power supply 880 may receive external power and internal power under control of the processor 850, and provide power required for operations of various components of the system.

The processor 850 includes one or more processors. For example, the processor 850 may include a central processing unit and a graphics processing unit. In this application, the central processing unit has a plurality of cores, and is a multi-core processor. The plurality of cores may be integrated into one chip, or each of the plurality of cores may be an independent chip.

The memory 870 stores a computer program, and the computer program includes an operating system program 872, an application program 871, and the like. For example, a typical operating system is a system used for a desktop computer or a notebook computer, such as WINDOWS of MICROSOFT Corp. or MACOS of APPLE Inc., or a system used for a mobile terminal, such as a Linux®-based Android® system developed by GOOGLE Inc. The method provided in the foregoing embodiment may be implemented by using software, and may be considered as specific implementation of the operating system program 872.

The memory 870 may be one or more of the following types of memories a flash memory, a hard disk type memory, a micro multimedia card type memory, a card type memory (for example, a secure digital (SD) or extreme digital (XD) memory), a random-access memory (RAM), a static random access memory (SRAM), a read-only memory (ROM), an electrically erasable programmable read-only memory (EEPROM), a programmable read-only memory (PROM), a RPMB, a magnetic memory, a magnetic disk, or an optical disc. In some other embodiments, the memory 870 may be a network storage device on the internet. The system may perform an operation such as updating or reading on the memory 870 on the internet.

The processor 850 is configured to read the computer program from the memory 870, and then perform a method defined by the computer program. For example, the processor 850 reads the operating system program 872, to run an operating system in the system and implement various functions of the operating system, or reads one or more application programs 871, to run an application in the system.

The memory 870 further stores other data 873 in addition to the computer program.

The NPU 890 is mounted to the main processor 850 as a coprocessor, and is configured to execute a task assigned by the main processor 850 to the NPU 890. In this embodiment, the NPU 890 may be called by one or more sub-threads of a facial recognition TA, to implement some complex algorithms in facial recognition. Specifically, the sub-thread of the facial recognition TA runs on a plurality of cores of the main processor 850, then the main processor 850 calls the NPU 890, and a result implemented by the NPU 890 is returned to the main processor 850.

A connection relationship between the modules is merely an example. A method provided in any embodiment of this application may also be applied to a terminal device having another connection manner, for example, all modules are connected through a bus.

Figure 9:
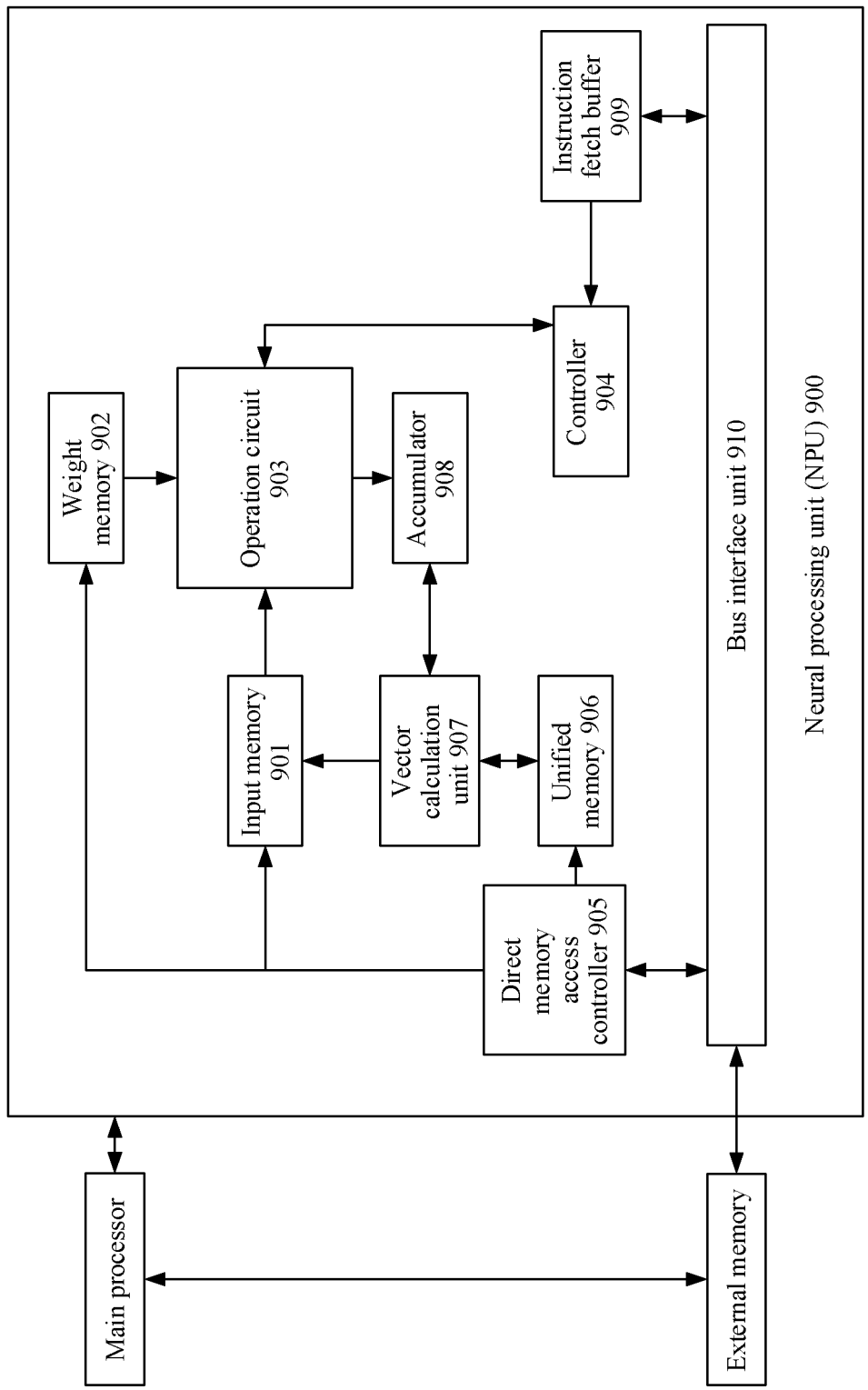
FIG. 9 is a schematic structural diagram of an NPU according to an embodiment of this application.

FIG. 9 is a schematic structural diagram of an NPU 900 according to an embodiment. The NPU 900 is connected to a main processor and an external memory. A crucial part of the NPU 900 is an operation circuit 903, and a controller 904 controls the operation circuit 903 to extract data from the memory and perform a mathematical operation.

In some implementations, the operation circuit 903 inside includes a plurality of processing engines (PEs). In some implementations, the operation circuit 903 is a two-dimensional systolic array. The operation circuit 903 may be alternatively a one-dimensional systolic array or another electronic circuit that can perform mathematical operations such as multiplication and addition. In some other implementations, the operation circuit 903 is a general-purpose matrix processor.

For example, it is assumed that there are an input matrix A, a weight matrix B, and an output matrix C. The operation circuit 903 fetches data corresponding to the matrix B from a weight memory 902 and buffers the data on each PE of the operation circuit 903. The operation circuit 903 performs a matrix operation on the matrix B and data, fetched from an input memory 901, of the matrix A, and store an obtained partial result or an obtained final result of the matrix into an accumulator 908.

A unified memory 906 is configured to store input data and output data. Weight data is directly copied to the weight memory 902 through a direct memory access controller (DMAC) 905 (for example, a DMAC). The input data is copied to the unified memory 906 also through the DMAC 905.

A bus interface unit 910 (BIU) is configured to interact with the DMAC 905 and an instruction fetch buffer 909 through an advanced extensible interface (AXI) bus.

The BIU 910 is used by the instruction fetch buffer 909 to obtain an instruction from the external memory, and is further used by the DMAC 905 to obtain original data of the input matrix A or the weight matrix B from the external memory.

The DMAC 905 is mainly configured to copy input data in the external memory to the unified memory 906, copy the weight data to the weight memory 902, or copy input data to the input memory 901.

A vector calculation unit 907 usually includes a plurality of operation processing units. If necessary, further processing is performed on an output of the operation circuit 903, such as vector multiplication, vector addition, an exponential operation, a logarithmic operation, and/or value comparison.

In some implementations, the vector calculation unit 907 can store a processed vector into the unified memory 906. For example, the vector calculation unit 907 may apply a non-linear function to the output of the operation circuit 903, for example, to a vector of an accumulated value, so as to generate an activation value. In some implementations, the vector calculation unit 907 generates a normalized value, a combined value, or both. In some implementations, the processed vector can be used as an activation input of the operation circuit 903.

The instruction fetch buffer 909 connected to the controller 904 is configured to store an instruction used by the controller 904.

The unified memory 906, the input memory 901, the weight memory 902, and the instruction fetch buffer 909 are all on-chip memories. The external memory in the figure is independent of the NPU hardware architecture.

It should be noted that the method provided in this embodiment may be alternatively applied to a non-terminal computer device, for example, a cloud server.

It should be noted that, in the foregoing embodiments, the facial recognition solution is mostly used as an example for description. However, it is definitely that the method provided in this application can be applied to another solution in addition to facial recognition. A person skilled in the art can easily figure out a similar implementation of another solution based on the implementation provided in this application.

It should be noted that division into modules or units provided in the foregoing embodiments is merely an example, and functions of the described modules are merely used as examples for description. This application is not limited thereto. A person of ordinary skill in the art can combine functions of two or more modules or divide a function of a module to obtain more modules at a finer granularity and in another variation as required.

For same or similar parts in the foregoing embodiments, mutual reference may be made to each other. "A plurality of" in this application means two or more or "at least two" unless otherwise specified. "A/B" in this application includes three cases "A", "B", and "A and B".

The described apparatus embodiments are merely examples. The modules described as separate parts may or may not be physically separate, and parts displayed as modules may or may not be physical modules, may be located in one position, or may be distributed in a plurality of network modules. Some or all the modules may be selected depending on actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art can understand and implement the embodiments of the present disclosure without creative efforts.

The foregoing descriptions are merely some specific implementations of this application, but are not intended to limit the protection scope of this application.

What is claimed is:

1. A multiprocessing method, implemented by a computer system comprising a trusted execution environment (TEE) and a rich execution environment (REE), wherein the multiprocessing method comprises:
creating, by the TEE, a sub-thread, wherein the sub-thread implements a sub-function of a trusted application (TA) on the TEE;
triggering, by the TEE, the REE to generate a shadow thread;
running, by the REE, the shadow thread on a core of the computer system to cause the core to enter the TEE; and
scheduling, by the TEE, the sub-thread for execution by the core.

2. The multiprocessing method of claim 1, further comprising:
generating, by the TEE, a notification in response to creating the sub-thread;
sending, by the TEE, the notification to the REE; and
creating, by the REE, the shadow thread based on the notification.

3. The multiprocessing method of claim 2, wherein the notification is a software interrupt.

4. The multiprocessing method of claim 1, further comprising recording, by the TEE, a correspondence between the shadow thread and the sub-thread.

5. The multiprocessing method of claim 4, further comprising recording, by the TEE, an identifier of the shadow thread in a first thread identifier in a thread control block (TCB) of the sub-thread, wherein the first thread identifier indicates a thread that accesses the sub-thread.

6. The multiprocessing method of claim 4, further comprising scheduling, by the TEE based on the correspondence, the sub-thread to a current core that the shadow thread uses to run when the shadow thread re-enters the TEE.

7. The multiprocessing method of claim 1, further comprising recording, by the TEE, a correspondence between the shadow thread and the core.

8. The multiprocessing method of claim 7, further comprising:
recording, by the TEE, an identifier of the shadow thread in an element corresponding to the core in a global status array in response to the core entering the TEE, wherein the global status array comprises a plurality of elements that each correspond to one core of the computer system; and
clearing, by the TEE, a value of the element in response to the core leaving the TEE.

9. The multiprocessing method of claim 1, further comprising calling, by the TEE, a neural processing unit (NPU) driver in the TEE to call an NPU of the computer system.

10. The multiprocessing method of claim 1, further comprising:
accessing, by the TEE, corresponding hardware through a hardware driver unit on the TEE; and
storing, by the TEE, data from the hardware in a security storage unit on the TEE.

11. The multiprocessing method of claim 1, wherein the TA is for implementing either a facial recognition function or a fingerprint recognition function.

12. A computer system comprising:
a plurality of processing cores configured to run a trusted execution environment (TEE) and in a rich execution environment (REE); and
a memory coupled to the processing cores and configured to store instructions that, when executed by the processing cores, cause the computer system to be configured to:
create, by the TEE, a sub-thread, wherein the sub-thread implements a sub-function of a trusted application (TA) on the TEE;
trigger, by the TEE, the REE to generate a shadow thread;
run, by the REE, the shadow thread on a core of the processing cores to cause the core to enter the TEE; and
schedule, by the TEE, the sub-thread for execution by the core.

13. The computer system of claim 12, wherein the instructions further cause the computer system to be configured to:
generate, by the TEE, a notification in response to creating the sub-thread;
send, by the TEE, the notification to the REE; and
create, by the REE, the shadow thread based on the notification.

14. The computer system of claim 12, wherein the instructions further cause the computer system to be configured to record, by the TEE, a correspondence between the shadow thread and the sub-thread.

15. The computer system of claim 14, wherein the instructions further cause the computer system to be configured to record, by the TEE, an identifier of the shadow thread in a first thread identifier in a thread control block (TCB) of the sub-thread, and wherein the first thread identifier indicates a thread that accesses the sub-thread.

16. The computer system of claim 14, wherein the instructions further cause the computer system to be configured to schedule, by the TEE based on the correspondence, the sub-thread to a current core that the shadow thread uses to run when the shadow thread re-enters the TEE.

17. The computer system of claim 12, wherein the instructions further cause the computer system to be configured to record, by the TEE, a correspondence between the shadow thread and the core.

18. The computer system of claim 17, wherein the instructions further cause the computer system to be configured to:
record, by the TEE, an identifier of the shadow thread in an element corresponding to the core in a global status array in response to the core entering the TEE, wherein the global status array comprises a plurality of elements that each correspond to one core of the REE; and
clear, by the TEE, a value of the element in response to the core leaving the TEE.

19. The computer system of claim 12, wherein the instructions further cause the computer system to be configured to:
access, by the TEE, corresponding hardware through a hardware driver unit on the TEE; and
store, by the TEE, data from the hardware in a security storage unit on the TEE.

20. A non-transitory computer-readable medium storing instructions that, when executed by a processor, cause a computer system to:
create, by a trusted execution environment (TEE), a sub-thread, wherein the sub-thread implements a sub-function of a trusted application (TA) on the TEE;
trigger, by the TEE, a processing core running in a rich execution environment (REE) to generate a shadow thread;
run, by the REE, the shadow thread on a core of the computer system to cause the core to enter the TEE; and
schedule, by the TEE, the sub-thread to the core for execution.

\* \* \* \* \*

UNITED STATES PATENT AND TRADEMARK OFFICE
CERTIFICATE OF CORRECTION

| | |
|---|---|
| PATENT NO. | : 11,461,146 B2 |
| APPLICATION NO. | : 17/126873 |
| DATED | : October 4, 2022 |
| INVENTOR(S) | : Dongdong Yao and Yu Li |

It is certified that error appears in the above-identified patent and that said Letters Patent is hereby corrected as shown below:

On the Title Page

Page 2, Item (56) References Cited, U.S. Patent Documents: "2021/0064740 A1 03/2021 Han" should read "2021/0064740 A1 03/2021 Hanel"

Signed and Sealed this
Twenty-ninth Day of November, 2022

Katherine Kelly Vidal
*Director of the United States Patent and Trademark Office*